United States Patent [19]

Van Berkel

[11] Patent Number: 4,817,275

[45] Date of Patent: Apr. 4, 1989

[54] DEVICE FOR POSITIONING A MEANS OF FIXING CONSISTING OF A SCREW AND A PLATE

[76] Inventor: Cornelis E. Van Berkel, Staringlaan 27, 1422 BG Uithoorn, Netherlands

[21] Appl. No.: 79,236

[22] Filed: Jul. 29, 1987

[30] Foreign Application Priority Data

Aug. 6, 1986 [NL] Netherlands .......................... 8602013

[51] Int. Cl.[4] .............................................. B23P 19/06

[52] U.S. Cl. .......................................... 29/787; 29/240; 29/809; 29/813; 81/57.4

[58] Field of Search ................. 29/240, 771, 809, 811, 29/813, 787; 81/57.4, 57.37; 227/43, 48, 100, 103

[56] References Cited

U.S. PATENT DOCUMENTS

| | | | |
|---|---|---|---|
| 2,787,303 | 4/1957 | Coder et al. | 29/809 X |
| 4,091,850 | 5/1978 | Kjölsrud | 29/240 |
| 4,246,939 | 1/1981 | Boegel | 29/771 |

FOREIGN PATENT DOCUMENTS

| | | | |
|---|---|---|---|
| 0003004 | 12/1978 | European Pat. Off. . | |
| 1171358 | 5/1964 | Fed. Rep. of Germany | 81/57.37 |
| 1322148 | 11/1961 | France . | |
| 2318985 | 7/1976 | France . | |
| 8604285 | 1/1986 | PCT Int'l Appl. . | |
| 383565 | 8/1973 | U.S.S.R. | 29/813 |
| 795626 | 5/1958 | United Kingdom . | |

*Primary Examiner*—Howard N. Goldberg
*Assistant Examiner*—Andrew E. Rawlins
*Attorney, Agent, or Firm*—Webb, Burden, Ziesenheim & Webb

[57] ABSTRACT

Device for screwing screws through a hole of a plate into a base plate for securing insulating material, the device having a magazine with plates and a magazine with screws. The device has a screw driver which can be moved up and down. The screw driver according to the invention feeds a plate and a screw towards their mating position in line with the screw driver during the upward stroke of the screw driver.

7 Claims, 4 Drawing Sheets

DEVICE FOR POSITIONING A MEANS OF FIXING CONSISTING OF A SCREW AND A PLATE

DESCRIPTION

The invention relates to a device for positioning a means of fixing which is formed by a screw and a plate, which plate is provided with a screw hole with an edge pressed out of the plane of the plate for countersinking the screw head, which device consists of a base plate, a housing positioned on the base plate with a guide, situated at right angles to the base plate, for a screwdriver carrier which can be moved up and down, a magazine for plates, a magazine for screws, means for feeding a plate one at a time from the magazine to an opening in the base plate, the centre of which opening is situated in the centre line of the screwdriver, means for feeding a screw one at a time to a point situated in the centre line of the screwdriver, which means for feeding a plate or a screw respectively are coupled to the carrier which can be moved up and down.

Such a device is known. Said known device has a plate magazine and also a magazine containing screws wherein the screws are accommodated in a tape which is advanced stepwise. In this known device, when the screwdriver is pressed downwards, a screw is fetched from the magazine tape to a position in which said screw is located in line with the screwdriver and, at the same time, a plate is slid from underneath the stack of plates in the plate magazine to an opening which is in line with the screwdriver. In this process, the plate is moved by a swivelling plate slide which is coupled to the means which move the magazine tape provided with screws. This device is used for mechanically mounting a thermally insulating layer on a roof such as a flat roof. Said known device is used to bring the plates and screws in line with the screwdriver at the same time while said electrically driven screwdriver is being pressed downwards, the screwdriver head which acts on the screw then engaging in the screw so that as the screwdriver is pushed further downwards, it screws the screw into the under layer while holding down the insulating layer at the same time via the plate.

Said known device is complicated and frequently gives rise to faults since screw and plate must be brought to the correct position with respect to each other and with respect to the screwdriver at the same time as the screwdriver is being pressed downwards. If this does not take place in time or in the correct manner, damage may occur. If the screwing-in operation is not completed, the device jams.

The object of the invention is to provide a device in which this drawback can no longer occur. A further object of the invention is to provide a device which is of very simple construction.

According to the invention this object is achieved in the first place in that said means are coupled to the carrier in a manner such that a subsequent plate is slid out of the magazine to the opening in the base plate and a subsequent screw is brought in line with the centre line of the screwdriver only during the upwards movement of the carrier to the starting position.

The positioning of a subsequent plate from the magazine in the opening thus now takes place during the return stroke, i.e. when the screwdriver is in fact being moved away from the means of fixing and the same applies to the screw. There is now no longer any risk of jamming due to the screwdriver coming into contact too soon with the as yet not correctly positioned screw or plate as it moves downwards since the screwdriver is in fact moving away from the plate or the screw during a movement towards the starting position for the subsequent working stroke. According to the invention it is therefore possible for the screw magazine to consist of a tube, provided at the bottom with a slit, which, being inclined at an acute angle upwards, adjoins a magazine holder, positioned in the housing, which is provided with a vertical drilled hole in line with the centre line of the screwdriver and has a diameter which can allow the shank of the screwdriver through. There is therefore no longer any need to make use of a magazine tape containing screws. It is sufficient to accommodate the screws in a tube which slopes so that the screws, suspended by their head, slide under their own weight to the position where they are in line with the centre line of the screwdriver, which sliding movement is possible as soon as the shank of the screwdriver has moved so far upwards that the screw can perform the required dropping movement. Such a magazine consisting of a tube is simple. A tube consisting of plastic material can be used in which a quantity of screws are placed, which tube is then inserted into the magazine holder and is replaced by a new tube filled with screws as soon as is necessary. Means for the stepwise movement of a tape are no longer necessary.

Preferably, the magazine holder is fitted in the housing so as to be adjustable in height in order to facilitate an adjustment to the length of the screws to be used in each particular case.

The vertical drilled hole of the magazine holder is preferably provided, near its bottom end and beneath the slit in the tube, with an elastic means which constricts the drilled hole, on which a screw head can rest and through which said screw head can be pressed. The screws sliding out of the tube then remain suspended by their head on the elastic means until the screwdriver acts on the head as it moves downwards and presses the latter through the elastic means.

Preferably, said elastic means are formed by a hairpin spring.

The means for feeding a plate from the plate magazine may, according to the invention, consist of a slider, guided in the base plate, which can be slid horizontally from a position next to the magazine under the magazine in the direction of the opening in the base plate, which slider is linked by means of a linkage system, fitted in a hinging manner, to the carrier which can be moved up and down. The plate slider does not therefore make any swivelling movement which is derived from the movement of a magazine tape, but makes a straight-line horizontal sliding movement which slides a plate from the magazine to the opening in the base plate while the screwdriver is moving upwards. The plate slid into the opening is preferably retained therein by means of springs acting on side edges. If the screwdriver is moved downwards, the linkage system ensures that the slider is again moved underneath the magazine to its starting position which is situated next to the magazine.

Preferably, the linkage system consists of two pairs of linkages on either side of the carrier, each consisting of a short linkage with slit guide fitted on the carrier so as to hinge and a long linkage, fitted on the slider so as to hinge, which engages by means of its top end, so as to hinge and be displaced, in the said slit guide of the short linkage and which has a slit provided between the ends by means of which said long linkage is supported so as to be displaced and to rotate on a pin mounted on the housing. This construction is simple and ensures, provided there is sufficient freedom for the slider to be slid aside, that the screwdriver, and consequently also the screw and plate, can be moved sufficiently far downwards.

According to the invention, the construction of the housing can furthermore be simple in that the housing consists of two side wall plates and a transverse wall fitted between the side wall plates at a position where said transverse wall defines a wall of the magazine, each side wall plate having a vertical slit in the section of the side wall facing away from the magazine for guiding the carrier, and each side wall plate having a bottom section, extending in the oppositely situated direction, which bottom sections define the side walls of the magazine and have end edges bent towards the latter which define a partially open fourth wall of the magazine.

The complete structure of the device is therefore simple since the housing consists only of a base plate, two side wall plates and a transverse wall which can be joined to each other, for example, by means of screws, the side wall plates having a slit guide for the electric screwdriver carrier and also for mounting the magazine holder adjustably. Essentially, the rest of the structure consists of strips formed by linkages with a number of hinging points and a handle mounted on the carrier.

The invention will now be explained in more detail by reference to the drawings.

Figure 1:
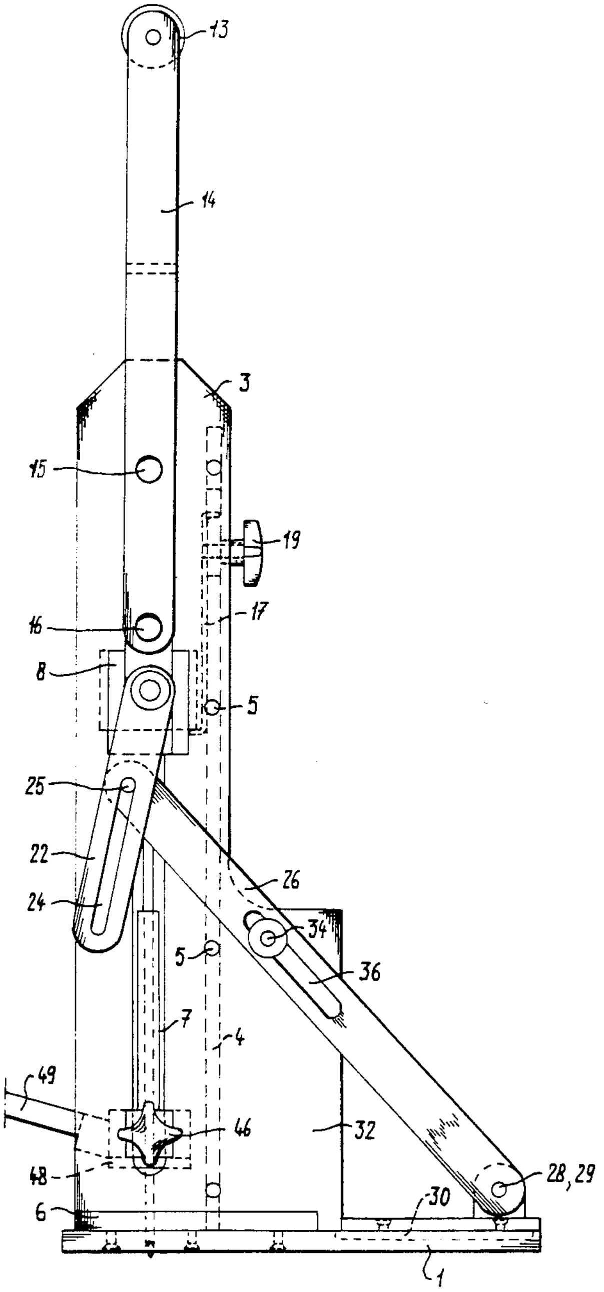
FIG. 1 is a side view of the device according to the invention.
Figure 2:
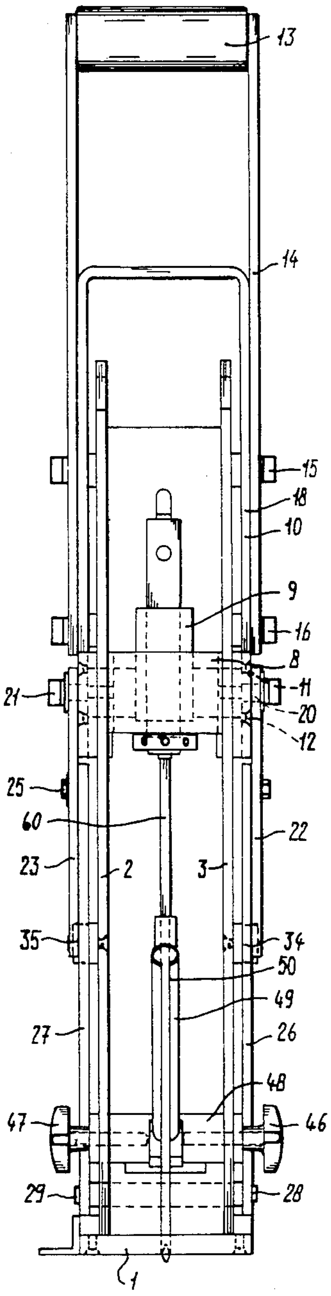
FIG. 2 is a front view of the device of FIG. 1.

The device shown in FIGS. 1 and 2 consists of a base plate 1, two side wall plates 2 and 3 respectively mounted thereon and a transverse wall 4 which is mounted by means of screws 5 between the side wall plates 2 and 3.

Figure 6:
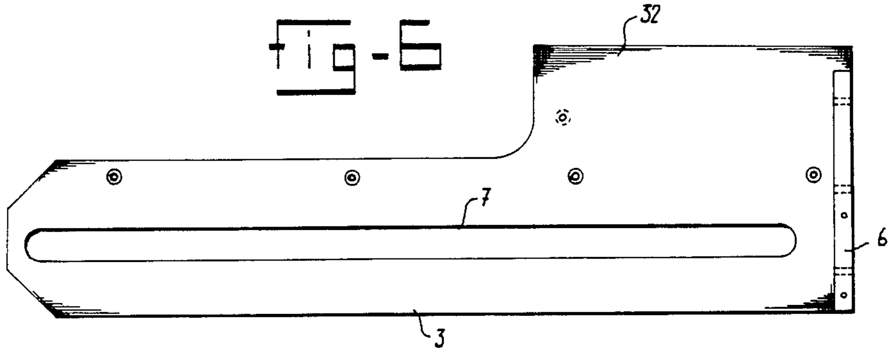
FIG. 6 is a side view of a side wall plate.
Figure 7:
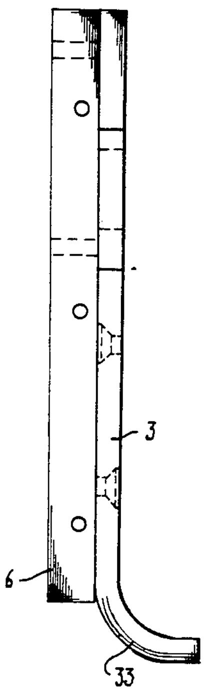
FIG. 7 is a plan view of the plate of FIG. 6.

FIGS. 6 and 7 show the side wall plate 3. The side wall plate 2 is the mirror image of the side wall plate 3. At the bottom edge, this plate has a transverse flange 6 for mounting on the base plate and is provided virtually over the complete height with a guide slit 7.

In said guide slits 7 it is possible to displace a carrier 8 having a holder 9 for receiving the front end of the housing of an electrical drilling machine (not shown).

On said carrier 8 there is mounted a bracket 10 by means of the screws 11 and 12, and thereon a part of the carrier which projects through the slit 7.

A handle 13 is mounted in turn on said bracket 10 by means of strips 14 and screws 15 and 16 respectively.

At 17 there is a stopping strip which can be adjusted in height with a stopping lip 18 for the carrier and with an adjustable clamping nut 19.

Figure 8:
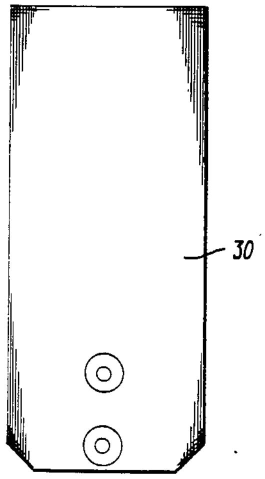
FIG. 8 is a plan view of the slider which is placed in the base plate.
Figure 9:
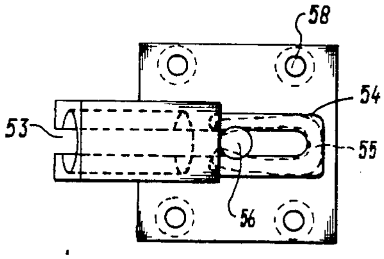
FIG. 9 is a plan view of a part of the magazine holder.
Figure 10:
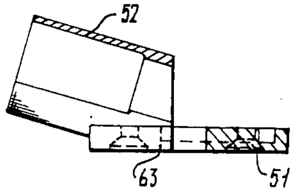
FIG. 10 is a side view of a partial section of FIG. 9.
Figure 11:
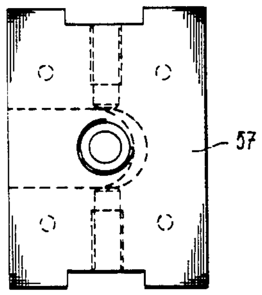
FIG. 11 is a plan view of another part of the magazine holder.
Figure 12:
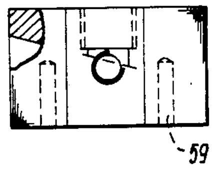
FIG. 12 is a side view thereof.

At 20 and 21 respectively there are mounted in a hinging manner on either side of the carrier the short linkages 22 and 23 respectively, each provided with a guide slit 24 in which a pin 25 slides, which is mounted on long linkages 26 and 27 respectively which are mounted at 28 and 29 respectively on the slider 30 which is shown in plan view in FIG. 8.

Figure 3:
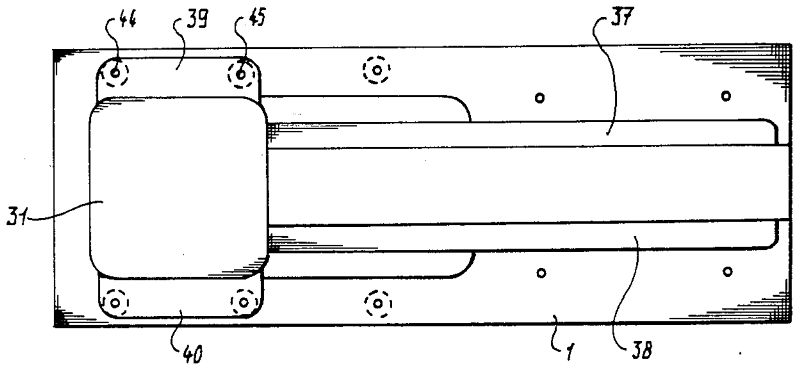
FIG. 3 is a plan view of the base plate of the device of FIGS. 1 and 2.
Figure 4:
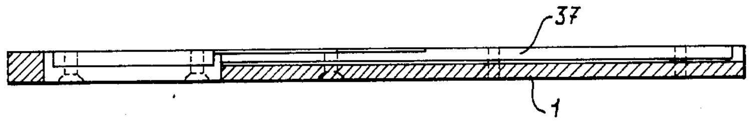
FIG. 4 is a section along the line IV—IV of FIG. 3.

The base plate 1 is shown in more detail in FIGS. 3 and 4. This plate has an opening 31 and dimensions such that a plate, such as, for example, the plate shown in FIGS. 13 and 14, can move through it.

The plate magazine is situated between the transverse wall 4 and the side walls 2 and 3. These have a wide part 32 in the bottom section which is shown in FIGS. 1 and 6, which wide part is bent inwards at 33, as shown in FIG. 7.

In said parts the side walls have hinging pins 34 and 35 respectively for supporting the long linkages 26 and 27 respectively in a hinging manner by means of the slits provided therein, such as the slit 36 (FIG. 1).

The base plate 1 is provided with a milled-out recess 37, 38 for guiding the slider plate 30 shown in FIG. 8.

Figure 5:
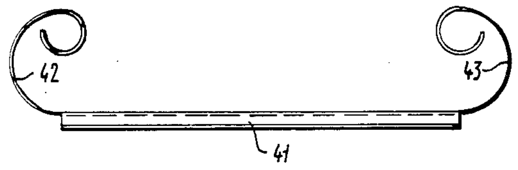
FIG. 5 is a plan view of a clamping spring to be positioned in the base plate.

FIG. 5 shows a spring which can be mounted on either side of the opening 31 in the recesses 39 and 40 respectively provided in the base plate, which springs can act by means of the section 41 on the side edges of a plate displaced to the opening 31 and are held in their place by means of the bent sections 42 and 43 and screws such as 44, 45.

In the bottom section of the long slits 7 which are provided in the side wall plates 2 and 3 respectively there is provided a magazine holder 48 which can be adjusted in height by means of the clamping nuts 46 and 47 respectively and into which a tube 49 is inserted which has a slit 50 at the bottom.

This magazine holder is shown in more detail in FIGS. 9 to 12 inclusive.

Said magazine holder has a base plate 51 having a sleeve 52, forming a single entity therewith, which also has a slit 53 at the bottom and into which a tube 49 filled with screws can be inserted. The base plate 51 has a recess 54 for receiving a hairpin spring 55 which constricts the clearance of the central drilled hole 56 somewhat, as shown. On top of said base plate there is situated a block 57, shown in FIGS. 11 and 12, which is used for guiding and for the clamping screws, and which is mounted on the base plate 51 with screws, the screw holes for which screws are indicated in the base plate at, for example, 58 and the drilled holes provided with screw thread at 59.

At 60 (FIGS. 1 and 2) there is situated a screwdriver shank which can be connected inside the carrier 8 and the holder 9 for the drill housing to an electric drill or screwdriver which is not shown, which shank 60 preferably has at the bottom end a cross-shaped screwdriver head, not shown, which can engage in a recess corresponding thereto in the head of a screw which is to be screwed in.

Figure 13:
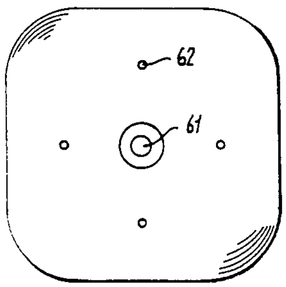
FIG. 13 is a plan view of a fixing plate.
Figure 14:
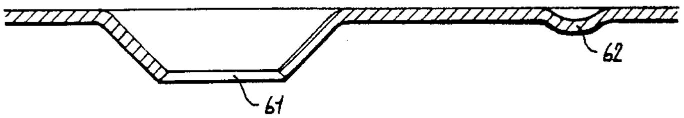
FIG. 14 is a section on a larger scale through a part of the plate of FIG. 13.

During operation a number of plates, as shown in FIG. 13, are situated in the magazine. Said plates have a central hole 61 and a number of bulges 62, obtained by indentation, which are staggered with respect to each other from plate to plate.

If the handle 13 is pulled upwards, the slider 30 in FIG. 1 will be displaced to the left by means of the linkages 22, 23 and 26, 27 respectively and during this process will displace the lowermost plate from the magazine to the opening 31 in the base plate, where said plate is retained by the springs shown in FIG. 5.

The screwdriver shaft passes through the drilled hole 56 of the magazine holder and thereby releases a screw which can thereby drop under the influence of its own weight into the opening. For this purpose, the base plate 51 has a slit 63 situated in line with the slit 53. Said screw is then suspended on the legs of the hairpin spring 55. If the handle 13 is again moved downwards, the slider 30 returns to the starting position shown in FIG. 1. Only then will the screwdriver grip the screw and press it through the hairpin spring while at the same time closing the screw magazine and will then move the point of the screw through the pressed-through opening 61 of the plate which will then, i.e. when the head of the screw reaches the plate, be released from the clamping springs 41.

The device described consists of parts which are simple to manufacture, is robust and is made in a manner such that the parts cannot clash with each other during operation.

I claim:

1. In a device for positioning in line a screw and the hole of a plate, which screw and plate form the means for fixing a layer on a substrate, with the hole of the plate having a downwardly pressed edge to allow countersinking of the screwhead, with the device including
   - a base plate;
   - a housing mounted above said base plate, said housing having a guide standing at right angles to said base plate;
   - a carrier for a screwdriver mounted slideably in said guide for movement up and down;
   - a screwdriver having a centerline, said screwdriver being positioned within said carrier;
   - a guide channel for said screwdriver;
   - a first opening in said base plate, the center of which first opening coincides with said centerline of said screwdriver, said first opening resiliently adapted to hold a plate;
   - a magazine for plates incorporated within said housing and adapted to contain a stack of plates;
   - a slide adapted to move parallel to said base plate at the level of the lowermost plate of the stack of plates, and further adapted to move said lowermost plate from the stack towards said first opening in said base plate;
   - a screw magazine, and a means for feeding a screw one at a time from said screw magazine into said guide channel;

the improvement comprising the arrangement wherein said carrier and said slide are mechanically connected and cooperatively provide means to move said lowermost plate from a stack of plates into said first opening of said base plate only during relative upward movement of said carrier with respect to said housing, with said carrier being connected with a handle present above the housing, wherein when the handle is moved upwardly, by hand, the carrier will be moved upwardly and the slide will move parallel to the base to move the lowermost plate into said first opening said guide having a step limiting upward movement of said carrier with respect to said housing, said guide channel having a constriction formed by elastic means allowing the passage under pressure of a screw head resting upon said constriction, and said screw magazine comprising a tube with a slit in the bottom through which a plurality of screws can extend with their heads resting inside said tube, said screwdriver being adapted to extend through said constriction and past a second opening connecting said screw magazine with said guide channel, said screwdriver further having a length such that only in the uppermost position of said carrier is said screwdriver clear of said second opening between said guide channel and said screw magazine.

2. Device as claimed in claim 1, wherein said screw magazine comprises a screw magazine holder positioned inside said housing and having a drilled hole therein which coincides with said guide channel, combined with a tubular means, having a slit at the bottom, joining said drilled hole, which tubular means extends at a sharp angle to the horizontal and is adapted to receive by insertion a tubular screw magazine, said tubular screw magazine further comprising a slit tube which fits into said tubular means of said screw magazine holder.

3. Device as claimed in claim 2, wherein said screw magazine holder is vertically adjustable within said housing.

4. Device as claimed in claim 1, wherein said constriction is formed by a U-shaped spring.

5. Device as claimed in claim 1, wherein the connection between said carrier and said slide comprises a system of pivotably interconnected links.

6. Device as claimed in claim 5, wherein said system of pivotably interconnected links further comprises two pairs of linkages on either side of said carrier, each pair consisting of a short linkage with slit guide fitted on said carrier so as to hinge, and a long linkage fitted on said slide so as to hinge, which long linkage further engages by means of its top end so as to hinge and be displaced in said slit guide of said short linkage, and which long linkage further has a slit provided between its ends by means of which said long linkage is supported so as to be displaced and to rotate on a pin mounted on said housing.

7. Device as claimed in claim 1, wherein said housing consists of two side wall plates and a transverse wall fitted between said side wall plates at a position wherein said transverse wall defines a wall of said magazine, each side wall plate having a vertical slit in the section of the side wall plate facing away from said magazine for guiding said carrier and each side wall plate having a bottom section extending in the oppositely situated direction, which bottom section defines the side walls of the magazine and which have an edge bent towards the latter which define a partially open false wall of the magazine.

* * * * *

UNITED STATES PATENT AND TRADEMARK OFFICE
CERTIFICATE OF CORRECTION

PATENT NO. : 4,817,275

DATED : April 4, 1989

INVENTOR(S) : Cornelis E. Van Berkel

It is certified that error appears in the above-identified patent and that said Letters Patent is hereby corrected as shown below:

Claim 1 Column 5 Line 58 delete the second occurrence of "with".

Claim 1 Column 6 Line 3 after "opening" insert --,--.

Claim 1 Column 6 Line 4 "step" should read --stop--.

Signed and Sealed this

Fourteenth Day of November, 1989

*Attest:*

JEFFREY M. SAMUELS

*Attesting Officer* *Acting Commissioner of Patents and Trademarks*